United States Patent [19]

Lenardson

[11] 4,365,440
[45] Dec. 28, 1982

[54] LEAKAGE RESISTANT CONTAINER FOR PLANT INJECTION APPARATUS

[75] Inventor: Donald D. Lenardson, Sun Valley, Calif.

[73] Assignee: J. J. Mauget Co., Burbank, Calif.

[21] Appl. No.: 286,208

[22] Filed: Jul. 23, 1981

[51] Int. Cl.³ .............................................. A01G 29/00
[52] U.S. Cl. ............................... 47/57.5; 128/200.22; 128/218 R; 222/398
[58] Field of Search ........................... 47/57.5; 220/8; 222/386, 398; 128/218, 200.22

[56] References Cited

U.S. PATENT DOCUMENTS

| | | | |
|---|---|---|---|
| 489,554 | 1/1893 | Cantwell | 222/398 |
| 2,894,509 | 7/1959 | Bednarz | 128/218 R |
| 2,902,191 | 9/1959 | Rhodes | 220/8 X |
| 3,237,815 | 3/1966 | Ogle | 222/386 |
| 3,286,401 | 11/1966 | Mauget | 47/57.5 |
| 3,819,040 | 6/1974 | Coons | 220/8 X |

Primary Examiner—Robert E. Bagwill
Attorney, Agent, or Firm—Donald Diamond

[57] ABSTRACT

A two-component, telescopically compressible, hollow container for plant injectable fluid compositions is provided with an improved sealing mechanism for negating capillary or other type of fluid leakage between closely fitting telescopic portions of the container walls. In a preferred form, the sealing mechanism comprises one or more circumferential ridges extending between the telescopic portions of the container walls.

2 Claims, 3 Drawing Figures

LEAKAGE RESISTANT CONTAINER FOR PLANT INJECTION APPARATUS

BACKGROUND OF THE INVENTION

This invention relates to apparatus for injecting plants, principally trees, with therapeutic liquid compositions; more particularly, it relates to such apparatus which incorporate a two-component, telescopically compressible, pressure generating, fluid container having an improved sealing mechanism for negating fluid leakage between closely fitting telescopic portions of the container walls. The improved sealing mechanism provides for enhanced safety in the shipping and handling of therapeutic liquid compositions including toxic liquid materials.

The treatment of plants, especially trees, through the injection of liquid nutrients and pest control agents has been practiced for some time. In particular, a method and apparatus for such treatment is described in U.S. Pat. No. 3,286,401 to Mauget wherein a sealed container comprising two mutually slideable cups with spaced interlocks is adapted to be employed in combination with a feeder tube that is driven into the trunk of a tree to be injected.

The slideable cups of Mauget provide a variable volume container in which sealing of the interior fluid reservoir is effected by means of interference fits between the concentric, smooth walls of the cup-like members of which it is assembled. Under most conditions, a suitable and reliable seal is attained by this structural arrangement. However, in some circumstances, small variations (a) in the concentricity of the cups, (b) in the physical dimensions of the container halves, and (c) in expansion and contraction induced by atmospheric conditions, as well as imperfections arising from surface scratches, can permit the discharge between the mutually slideable walls of at least a portion of the liquid contents of the container during shipment or storage. Such leakage is especially likely to occur with liquid contents showing a high affinity for forming capillary films.

Since the liquid compositions which are adapted for use in plant injection apparatus employing telescopic-type containers include insecticides and fungicides which may be toxic or otherwise harmful, the probability of leakage between the telescopic wall portions of such containers must be reduced or eliminated.

Accordingly, an object of this invention is to provide a two-component telescopically compressible, hollow container for plant injectable fluid compositions which includes an improved hermetic sealing mechanism for interdicting capillary or other type of fluid leakage between closely fitting telescopic portions of the container walls.

Another object of this invention is to provide two-component telescopically compressible, hermetically sealed, hollow containers for plant injectable fluid compositions wherein hermetic sealing is effected by the juxtaposition of relatively minute, concentric ridges extending between mating faces of interfitting, telescopically slideable, cup-like members forming a sealed container.

SUMMARY OF THE INVENTION

In accordance with this invention, there is provided a hermetically sealed, telescopically compressible, binary container of variable volume for plant injectable fluid compositions.

The container comprises a pair of cup-like body portions having interfitting and mutually slideable sidewalls which telescopically engage through the open ends of the body portions. One of the body portions defines a closure having a base and a depending, substantially cylindrical, sidewall. The other body portion defines a receptacle having a base and depending inner and outer substantially cylindrical sidewalls in spaced relationship with this spaced relationship being open at the end opposite from the receptacle base and defining an annular space for slideably receiving the closure sidewall. The closure base together with the receptacle base in cooperation with the closure sidewall and the receptacle inner sidewall define a single, undivided interior volume. This interior volume is adapted to be partly filled with a plant injectable fluid composition with the remainder of the interior volume being occupied by a gaseous substance such as atmospheric air.

Stop means are provided at outer and inner axially spaced positions on the mutually slideable sidewalls of the body portions of the container, with the outer position defining an enlarged interior volume for the container and the inner position defining a reduced interior volume for the container, whereby relative movement of the body portion from the outer position to the inner position reduces the interior volume of the container. Cooperating ring and groove means may be employed to locate and define the outer and inner axially spaced stop positions, with two, spaced circumferential rings being disposed on the outer surface of the closure sidewall and a single circumferential groove being disposed within the inner surface of the receptacle outer wall. When the telescopically compressible, binary container is in the outer position, the container defines a larger interior volume which contains the plant injectable fluid together with the pressurizing gas which is initially charged into the container at atmospheric pressure. To generate the required injection pressure, the binary container is telescopically compressed to relocate the stop means from the outer to the inner position and thereby reduce the interior volume of the container.

Hermetic sealing means are provided between the closure and receptacle of the binary container, and, therefore, between the interior volume of the container and the external atmosphere in order to prevent leakage through capillary action or other type of fluid flow. The hermetic sealing may be effected by means of at least one circumferential ridge extending between the mutually slideable sidewalls of the closure and receptacle. In one embodiment, a plurality of circumferential ridges project from the outer surface of the receptacle inner sidewall into contact with the inner surface of the closure sidewall.

The circumferential sealing ridges are, advantageously, provided with a triangular cross-section so that the contact between the tips of the ridges and the smooth, cylindrical inner surface of the closure sidewall is a sharply defined line. The relative dimensions of the diameters of the receptacle inner sidewall and the closure sidewall are so selected that the ridges forming the hermetic seal are pressed into the surface of closure sidewall with considerable interference force which generates high pressure at the contact lines. This high pressure zone tends to interdict the formation and propagation of capillary liquid film which might otherwise be generated between the closely adjoining surfaces and, consequently, impedes and prevents the flow of liquid from the interior of the container towards the outer atmosphere.

In the preferred mode of employment, a number of essentially identical, parallel ridges may be provided circumferentially on the outer surface of the receptacle inner wall. In addition, there may also be provided a similar ridge, axially spaced from the previously described ridges, on the inner surface of the closure sidewall, as well as yet another circumferential ridge, of smaller radial dimension than the previously described ridges, as an uppermost ridge on the outer surface of the receptacle inner sidewall, in axial juxtaposition with the inwardly projecting ridge additionally provided.

The contents of the hermetically sealed, binary container provided by this invention may be introduced into the interior of a tree or other plant to be treated by means of a feeder tube driven into the tree trunk. A discharge passage is provided in the receptacle. This passage is separated from the interior volume of the container by a thin, penetrable diaphragm, in such a manner that after pressurization of the interior volume is completed, the entire container may be pressed onto the outboard end of the feeder tube so that the aforementioned diaphragm is penetrated by the tube and the contents of the container discharged through the tube and into the tree.

The container of the invention is readily manufactured from conventional materials and by generally known methods of manufacture. A particularly suitable method of manufacture is injection molding of polyethylene resin, or similar plastic material, which provides an appropriate telescopically compressible, binary container for plant injectable fluid compositions.

DETAILED DESCRIPTION

Figure 1:
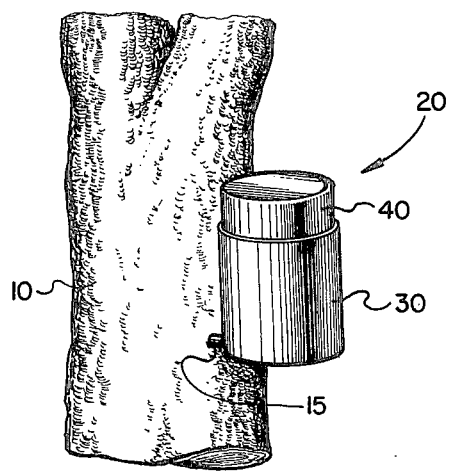
FIG. 1 is a perspective view of a plant injection apparatus installed onto a tree trunk with the binary container compressed into the inner, injectable, pressurized configuration.

The perspective view of FIG. 1 shows a tree trunk 10 penetrated by one end of a delivery or feeder tube 15 with the other end of the tube being in fluid flow communication with the interior volume of a binary injection container 20. The container 20 comprises an upper body portion, or closure, 40 and a lower body portion, or receptacle, 30 which conjointly define the interior volume of the container. The combination of the container 20 and the delivery tube 15 provides a plant injection apparatus whereby liquid treatment materials such as nutrients, pesticides, and fungicides as well as other chemical compositions may be introduced directly into the sap flowing in the plant for systemic application. A hermetic seal between closure 40 and receptacle 30, to be more fully described below, interdicts any prospective capillary leakage or the like arising from the use of the aforesaid liquid treatment materials and permits such materials to be loaded into a container 20 and to be injected into a tree trunk 10 without coming into contact with any person or object in the course of transportation and handling of such containers.

Figure 2:
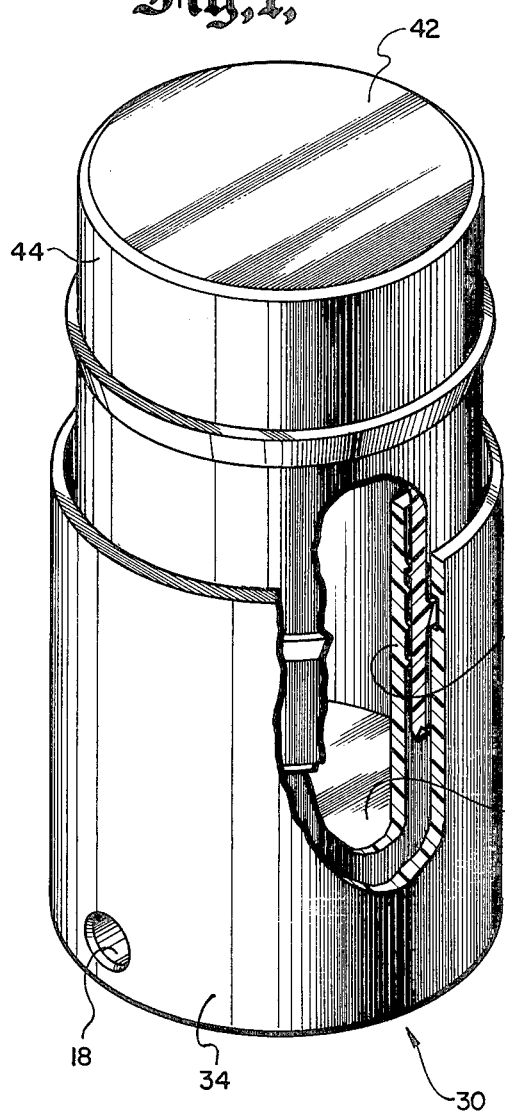
FIG. 2 is a perspective view, in partial section, of the binary container in its first or outer position which is utilized for shipment and storage of its fluid content.

The perspective view of FIG. 2 shows the closure 40 and receptacle 30 in a first, or outer, axial position, in contrast to that shown in FIG. 1 where the closure and receptacle have been axially compressed to a second, or inner, axial position to generate an increased pressure to effect enhanced flow of the fluid composition from the interior of the container through the delivery tube and into the plant sap stream.

The receptacle 30, which has a cup-like configuration open at one end, is provided with a base 32 and outer and inner parallel, spaced, cylindrical sidewalls 34, 38. The spaced relationship between the outer and inner sidewalls defines an annular space or socket 48 which is open, at the open end of the receptacle, for slidably receiving the closure sidewall.

The closure 40 is provided with a base 42 and a depending cylindrical sidewall 44. The closure, like the receptacle, defines a cup-like configuration that is open at one end. The closure sidewall 44 is slidably received in the receptacle socket 48 to provide an enclosed binary container.

Two parallel rings 50, 52, project from the outer surface of closure sidewall 44. The distance between the rings defines the extent of axial travel of the components of the binary container 20 which corresponds to the extent of compression of the internal volume of the container that is initially defined by the internal volume 36 of the receptacle and the internal volume 46 of the closure. The compression of the internal volume of the container is utilized in pressurizing the fluid contents of the container for injection into the plant sap stream. To ease axial movement of the closure 40 into engagement with the receptacle 30, the rings 50, 52 are ramped or inclined on their faces pointing toward the open end of closure sidewall 44. This geometrical shape provides each ring with a ratchet-like configuration.

The inner surface of the receptacle outer wall 34 is provided with a groove 54 for successively receiving the spaced rings 52, 50 which project beyond the inner surface of the receptacle outer wall for effective engagement with the groove. Ring 52 is seated in groove 54 at the time of assembly of the binary container while ring 50 is urged into alignment and seating with groove 54 at the time of compression to effect pressurization of the fluid contents. Ring 52, when located in the groove 54 of the receptacle 30, defines an axial stop, or latch, for maintaining the binary container in a preselected axial position. The ratchet-like configuration of the ring impedes reversible disengagement of the closure from the receptacle while permitting forward, telescopically compressible, movement of these components with respect to each other.

At the time of use, the closure and receptacle components of the binary container are telescopically compressed to axially displace ring 52 from groove 54 and axially move ring 50 into seating engagement with that groove. The ratchet-like characteristics of ring 50 provide an effective stop which assures the stability and integrity of the binary container in the presence of increased internal pressure generated by reducing the internal volume of the container.

The receptacle 30 of the binary container is also provided with an orifice 18 for receiving a delivery tube 15 through which the liquid contents of the container are transferred into the plant to be treated. A depression 70 in the surface of the receptacle base 32 forms part of the receptacle internal volume and serves as a channel for the discharge of the liquid contents of the container through orifice 18, once the protective membrane, which is molded integrally with the receptacle 30, is pierced by the outer end of the delivery tube 15.

Figure 3:
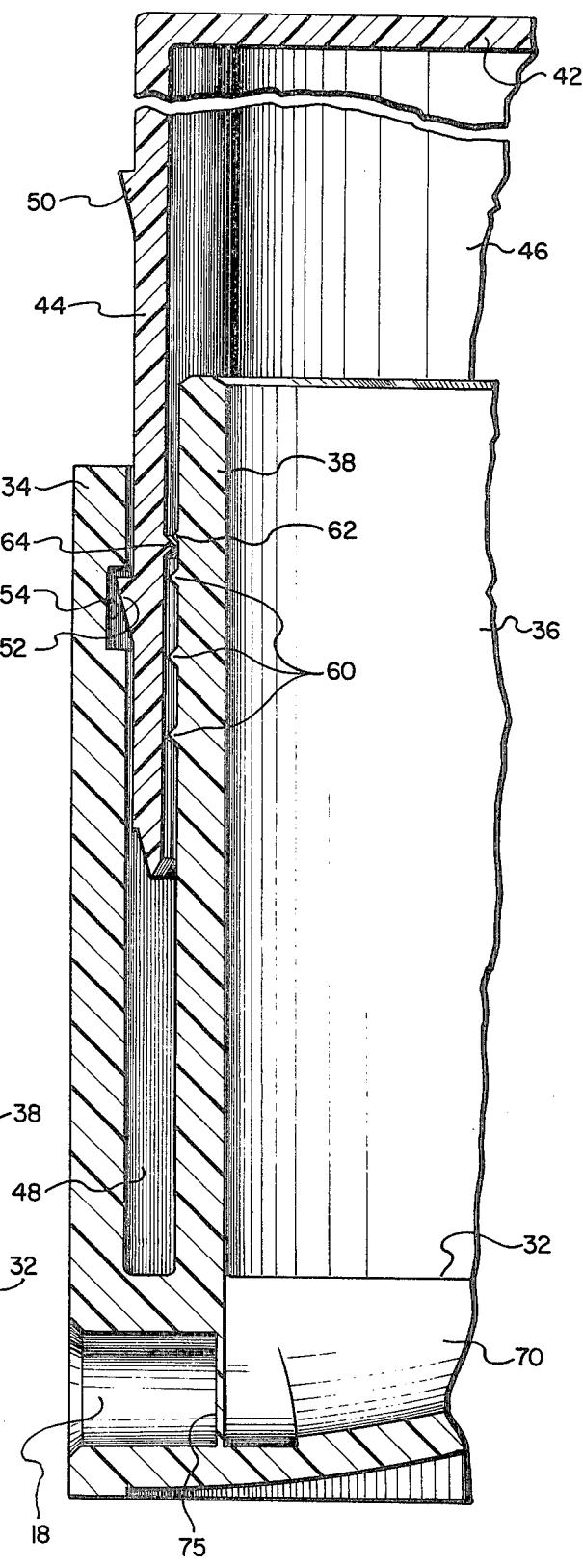
FIG. 3 is a partial vertical section through the binary container showing the location, relative size, and placement of the hermetic sealing ridges for interdicting capillary flow between the closely fitting sidewalls of the closure and the receptacle.

The partial, vertical section of FIG. 3 also shows, with particularity, the use of projecting ridges 60 for effecting hermetic sealing between the components of the binary container. The projecting ridges, which are disposed in parallel relationship and in orthogonal alignment with the axis of the cylindrical sidewalls, run circumferentially around the outer surface of the receptacle inner sidewall 38. These ridges project a small distance from the sidewall surface, typically on the order of about 0.025 inch and are, in the preferred mode of use, triangular in section. The ridges 60, with their relatively sharp outer edges, project toward and into engagement with the inner side of the closure sidewall 44, with the relative dimensions being so selected that the ridges exert a positive force on the closure sidewall.

The ridges 60 serve as a hermetic seal between the internal volume of the container and the external atmosphere and as a barrier to the formation of capillary flow, in the event that any of the liquid content of the container enters into the interstitial space between the closure sidewall 44 and the receptacle inner sidewall 38.

The ridges 60 could be integral with the inner surface of closure sidewall 44 and project toward and into engagement with the outer surface of the receptacle inner sidewall 38, since their function would remain substantially the same. However, the preferential placement of the ridges on the receptacle sidewall arises from the recognition that the delicate structure represented by the minute projections of the ridges 60 are better protected, prior to assembly, in the partially enclosed space of receptacle socket 48, as opposed to the relatively accessible inner surface of closure sidewall 44.

The binary container of this invention is, advantageously, also provided with a further pair of oppositely disposed, cooperating, circumferential ridges 62, 64. One ridge 62 from the cooperating pair of ridges projects outwardly from the outer surface of the receptacle inner sidewall 38. This ridge 62 is parallel to ridges 60 and is axially disposed above ridges 60 and groove 54. The radial projection of this ridge 62 is much smaller than that of the ridges 60, on the order of about 0.004 inch. The other ridge 64 of the cooperating ridge pair 62, 64 projects from the inner surface of the closures sidewall 44 into positive engagement with the outer surface of the receptacle inner sidewall 38. The dimensions of this latter ridge 64 generally correspond to those of ridges 60. Ridge 64 is proximate to and defines a sealing boundary with ridge 62 when ring 52 is seated in groove 54 during transport and handling of the binary container prior to plant injection.

The principal components of the binary container 20, namely, the closure 40 and the receptacle 30, may be readily manufactured by utilizing customary molding techniques with a suitable plastic resin such as polyethylene.

While in the foregoing description and accompanying drawing there has been shown and described the preferred embodiment of this invention, it will be understood, of course, that minor changes may be made in the details of construction as well as in the combination and arrangement of parts without departing from the spirit and scope of the invention as claimed.

That which is claimed is:

1. A two component, telescopically compressible, hollow container for plant injectable fluid compositions which includes hermetic sealing means extending between the telescopic portions of said container to prevent leakage through capillary film formation, wherein said components are telescopically compressible from an outer position of an enlarged interior volume to an inner position of reduced interior volume and said hermetic sealing means are defined by a plurality of perimetrical ridges which project outwardly from a first of said container components into positive engagement with a second of said container components with said plurality of ridges including an uppermost perimetrical ridge that projects outwardly to a lesser extent than the other ridges in said plurality of ridges, and wherein said hermetic sealing means further includes a single perimetrical ridge that projects outwardly from the second of said container components into positive engagement with the first of said container components at a locus proximate to said uppermost ridge when said container is disposed in the outer position.

2. A variable volume hollow container for plant injectable fluid compositions comprising:

a pair of opposing cup-like body portions having interfitting and mutually slidable sidewalls, with said body portions cooperatively defining a single, undivided interior volume for releasable containment of a pressurized plant injectable fluid composition, wherein one of said body portions defines a closure having a substantially cylindrical sidewall and the other of said body portions defines a receptacle having inner and outer substantially cylindrical sidewalls in spaced relationship with said spaced relationship defining an annular space for slidably receiving the sidewall of said closure;

stop means at outer and inner axially spaced positions on the mutually slidable sidewalls of said body portions, said stop means being incorporated onto the outer surface of the closure sidewall and onto the inner surface of the receptacle outer sidewall, with said outer position defining an enlarged interior volume for said container and said inner position defining a reduced interior volume for said container, whereby relative movement of said body portions from said outer position to said inner position reduces the interior volume of said container to effect pressurization of the fluid composition in said container;

discharge passage means, including penetrable diaphragm means, formed in one of said body portions to permit the discharge of pressurized fluid composition from the reduced interior volume of said container; and hermetic seal means extending between opposing faces of the mutually slidable sidewalls of said body portions to prevent leakage through capillary film formation, said hermetic sealing means being defined by a plurality of circumferential ridges that extend from the outer surface of the receptacle inner sidewall to the inner surface of the closure sidewall, said plurality of circumferential ridges including an uppermost ridge which is closest to the open end of said receptacle and projects from the outer surface of the receptacle inner sidewall to a lesser extent than the other ridges in said plurality of ridges; and wherein a single circumferential ridge projects from the inner surface of the closure sidewall to the outer surface of the receptacle inner sidewall at a locus proximate to said uppermost circumferential ridge when said body portions are disposed in the outer position.

* * * * *